United States Patent Office.

GUSTAVE BOURGADE, OF NEW YORK, N. Y.

Letters Patent No. 106,313, dated August 16, 1870.

IMPROVEMENT IN COMPOUND FOR FERTILIZER.

The Schedule referred to in these Letters Patent and making part of the same

*To all whom it may concern:*

Be it known that I, GUSTAVE BOURGADE, of the city and State of New York, have invented an Improvement in Artificial Manures or Fertilizers; and the following is declared to be a correct description thereof.

This fertilizer is made of blood and lime, mixed together, the albumen being extracted.

The method pursued in the making of this artificial manure is to mix slaked lime with the blood to the extent of about ten per cent., more or less; then add water, and subject the mass to a low heat to evaporate the water added, or a portion of it; then the coagulated mass is subjected to pressure, to expel the albumen, as set forth in an application for a patent on improvement in the preparation of albumen of the same date as this application.

The cake or mass of material remaining forms my artificial fertilizer, and it may be dried and ground up, or the water of condensation from the foregoing evaporation (containing ammonia) may be mixed again with the coagulated mass after the albumen has been removed.

My artificial fertilizer, made as aforesaid, is a new article of manufacture, containing fertilizing properties, and utilizing otherwise refuse material.

I claim as my invention—

The fertilizing material, made in the manner substantially as specified.

Dated this 24th day of May, A. D. 1870.

GUSTAVE BOURGADE.

Witnesses:
    HAROLD SERRELL,
    GEO. T. PINCKNEY.